Feb. 28, 1967  H. M. OGLE  3,307,094
A.-C. SWITCH SPEED CONTROL SYSTEM FOR A.-C. MOTORS
Filed Dec. 30, 1963
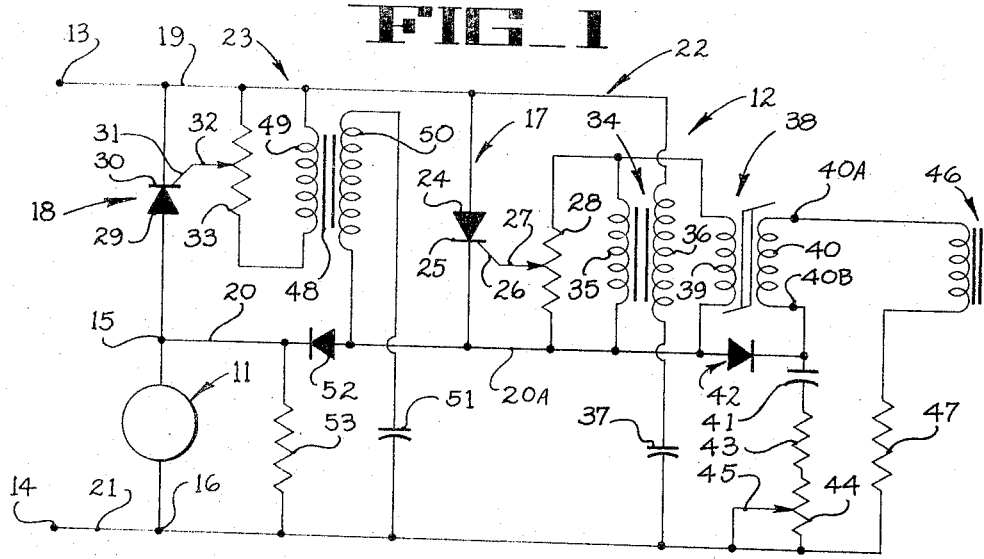
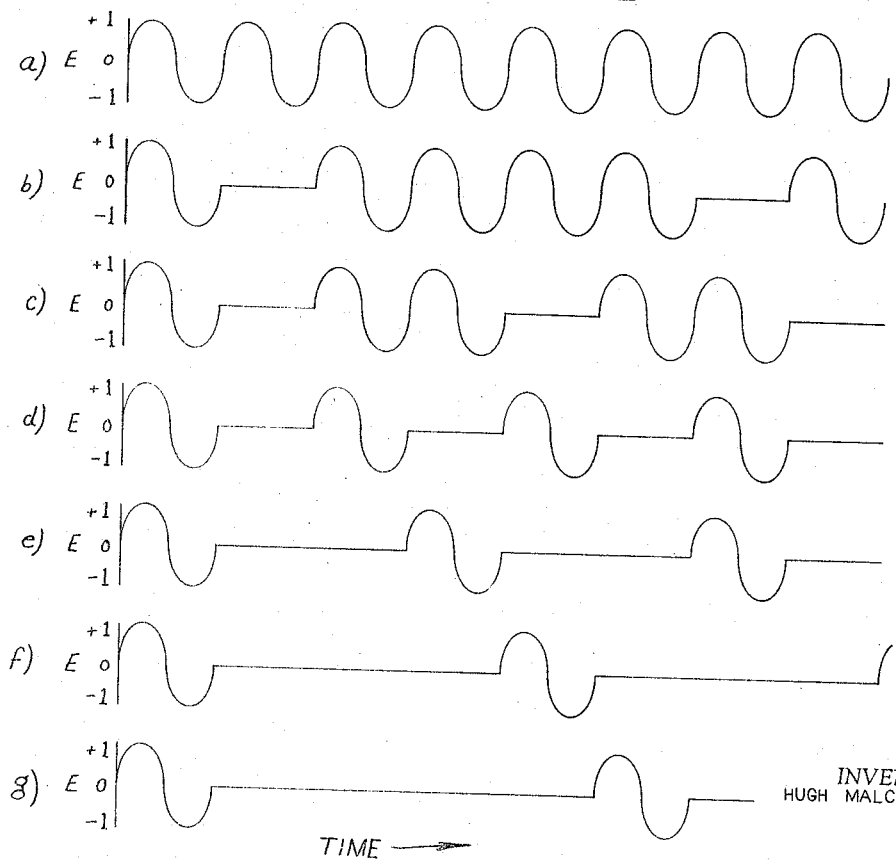
INVENTOR.
HUGH MALCOLM OGLE
BY Robert R Thornton United States Patent Office 3,307,094
Patented Feb. 28, 1967

3,307,094
A.-C. SWITCH SPEED CONTROL SYSTEM
FOR A.-C. MOTORS
Hugh Malcolm Ogle, 70 Jordan Place,
Palo Alto, Calif. 94303
Filed Dec. 30, 1963, Ser. No. 334,247
6 Claims. (Cl. 318—341)

The present invention relates to speed control of induction and synchronous motors, and more particularly to the control of the speed of such motors by controlling the effective frequency of the A.-C. power applied to the motor.

Induction motors are the most commonly used form of electric motor when the power source is an alternating current. These motors are rugged, reliable, and relatively inexpensive. They operate without the need for brushes with their attendant wear and sparking problems and the resultant radio interference. Induction motors operated from an A.-C. line power source are fundamentally constant speed motors. The stator windings set up a rotating magnetic field which drags the rotor along with its rotation. When the motor is not connected to a load, the rotor speed will be almost synchronous with the speed of rotation of the magnetic field. When a load is connected to the motor, the rotor speed will slip behind and slow down a few percent. If the load becomes excessive, the amount of slip becomes large and the torque falls off rapidly. Excessive slippage results in a stalled motor. If the voltage applied to an induction motor is lowered in an attempt to reduce its speed, the no-load speed is only slightly affected and the tendency of the motor to stall is greatly increased. The only practical method for controlling the speed of induction motors is to change the frequency of the power supply derived from the A.-C. line and applied to the motor.

Synchronous motors, while not in as wide spread use as induction motors, enjoy considerable popularity. As with induction motors, the speed of synchronous motors is most readily controlled by controlling the frequency of the A.-C. power applied to the motor.

Several methods of changing the frequency of the power supply utilized to energize such motors are in use today. Such methods conventionally involve rotating machinery, electronic tubes, or solid state devices, and in general rectify the incoming power so as to produce a D.-C. potential. This D.-C. potential is then inverted to produce an A.-C. power source of the desired frequency. These conventional practices have several disadvantages. For example, both the rectifying elements and the inverting elements must handle the full kilovolt-ampere requirements of the load, together with the additional power losses inherent in such circuits. Also, control circuits must be provided to limit the motor voltage as the frequency is lowered, in order to avoid saturation of the magnetic circuits of the motor. Thus, such conventional systems tend to be complex and expensive.

According to the present invention, a method for controlling the speed of induction and synchronous motors between zero and synchronous speeds consists of the cyclical inhibition of the application to the motor of a plurality of half cycles of the A.-C. potential utilized as the motor power source. The actual number of half cycles so inhibited is selected to provide the appropriate motor speed. Thus, as the number of cycles whose application is inhibited is increased, the motor speed decreases from synchronous toward zero. As used herein, the term "synchronous" means the no-load rotational rate of the motor, which is, of course, always somewhat less than the synchronous speed of induction motors computed with regard to the number of motor poles and the frequency of the A.-C. power source.

In its preferred form, a circuit for controlling the speed of synchronous and induction motors between synchronous and zero speeds, according to the invention, utilizes a normally open A.-C. switch means connected between the A.-C. potential source and the motor, together with means for cyclically closing the A.-C. switch means so as to apply the A.-C. potential to the motor, and means for selecting the period of closure of the A.-C. switch means. By selecting the period of closure of the A.-C. switch means, the number of one half cycles of the A.-C. potential applied to the motor is controlled for each cycle of switching, and thus the motor speed is controlled by an averaging of the total number of cycles of A.-C. potential applied to the motor over a number of switching cycles, i.e., a comparatively long time interval with respect to the period of a single cycle of the A.-C. power source.

The invention may be more readily understood by referring to the accompanying drawing in which:

FIGURE 1 is a schematic diagram of a circuit for controlling the speed of an induction or synchronous motor according to the invention; and FIGURE 2; parts (a) through (g) being taken together, is a graphical representation of the time-voltage relationship of the A.-C. potential applied to an induction or synchronous motor in controlling motor speed according to the invention.

Referring now to FIGURE 1, there is shown an electrical circuit consisting of a conventional synchronous or induction motor 11 and an A.-C. switch 12. An A.-C. potential (not shown), which constitutes the power source for operation of the motor, is applied across a pair of line terminals 13, 14. The motor 11 has a pair of motor power input terminals 15, 16. The A.-C. potential which actually energizes the motor 11 is applied across the terminals 15, 16, as will subsequently be explained.

The A.-C. switch 12 consists generally of a pair of silicon controlled rectifiers 17, 18, connected between a pair of leads 19, 20, in back-to-back relationship. It will be noted that the lead 19 is also connected to the line terminal 13, and the lead 20 is also connected to the motor power input terminal 15. A lead 21 connects the motor power input terminal 16 to the line terminal 14. The A.-C. switch 12, insofar as it has been described, would be operable, if the rectifiers 17, 18 were conventional diodes, rather than silicon controlled rectifiers, to apply, to the motor terminal 15, both the positive and negative portions of every cycle of A.-C. potential applied to the line terminal 13 by the A.-C. power source. The motor 11 would thus rotate at its normal speed. However, by the utilization of the silicon controlled rectifiers 17, 18 in the A.-C. switch 12, one or both of the rectifiers 17, 18 can be made to pass less than all of the half cycles of appropriate polarity of A.-C. potential applied thereto. By eliminating half cycles in this manner, the effective frequency of the A.-C. power actually applied to the motor 11 is reduced, and, therefore, the speed of the motor 11 is reduced.

The circuitry utilized in FIGURE 1 for control of the silicon controlled rectifiers 17, 18 is unique, and consists of a drive circuit 22 associated with the silicon controlled rectifier 17, hereinafter referred to as the drive rectifier 17, and a slave circuit 23 associated with the silicon controlled rectifier 18, hereinafter referred to as the slave rectifier 18. It will be noted that the drive rectifier has an anode 24 connected to the lead 19, a cathode 25 connected to the lead 20 through a conventional diode rectifier 52, and a gate or trigger electrode 26 connected to an arm 27 of a drive circuit gate potentiometer 28. The slave rectifier 18 has an anode 29 connected to the lead 20, a cathode 30 connected to the lead 19, and a gate or trigger electrode 31 connected to an arm 32 of a slave circuit gate potentiometer 33. The potentiometers 28 and 33 are utilized to match the gate pulses generaed by the drive circuit 22 and slave circuit 23 with the operating characteristics of the drive rectifier 17 and slave rectifier 18, respectively, so as to select the effective voltage-time integral energization applied to the motor 11 through the recifiers 17, 18.

The drive circuit gate potentiometer 28 is connected to a drive circuit gate generating transformer 34 across its secondary winding 35, the transformer 34 having a primary winding 36 connected between the leads 19 and 21 in series with a phasing capacitor 37. A saturable reactor 38 has its reactance winding 39 connected across the drive circuit potentiometer 28 and the drive circuit transformer secondary winding 35, so as to form a parallel circuit therewith, one side of which circuit is connected to a portion 20A of the lead 20. The saturable reactor 38 has a control winding 40 which has a terminal 40A coupled to the lead 20A by a rectifier diode 42. The terminal 40A is also coupled to the lead 21 by series circuit consisting of charge circuit capacitor 41, charge circuit current limiting resistor 43, and charge circuit control potentiometer 44. It will be noted that the poentiometer 44 has an arm 45 which is also connected to the lead 21. A serially connected inductor 46 and fixed resistor 47 are connected between a terminal 40B of the saturable reactor secondary winding 40 and lead 21 so as to form a circuit paralleling the circuit consisting of the secondary winding 40, capacitor 41, resistor 43, and potentiometer 44.

The slave circuit 23 includes a slave pulse generating transformer 48, whose secondary winding 49 is connected between the lead 19 and one end of the slave potentiometer 33, the opposite end of the slave potentiometer 33 being connected to the lead 19, so that a signal developed in the slave transformer secondary winding 49 is applied across the slave potentiometer 33 and through the potentiometer arm 32 to the slave rectifier gate 31. The slave transformer 48 has a primary winding 50 which is connected in series with a slave phasing capacitor 51 between the lead 20A and the lead 21.

The operation of the circuit of FIGURE 1 will now be described. As has been previously mentioned, the principle of the invention is the changing of the effective frequency applied to the motor by inhibiting the application to the motor of one or more half cycles of the A.-C. line power. As shown in FIGURE 1, the drive rectifier 17 supplies to the lead 20, positive half cycles of the A.-C. potential applied to the line terminal 13, when the drive rectifier 17 is gated or triggered to its closed or conducting condition. Similarly, the slave rectifier 18 supplies negative half cycles of the A.-C. potential when the slave rectifier 18 is gated closed. To avoid saturation of the magnetic circuits of the motor and to avoid the generation of a D.-C. component in the motor circuitry, the number of positive half cycles and negative half cycles of A.-C. power applied to the motor per unit of time is selected so as to be equal in the preferred embodiment of the invention, although it could be otherwise if so desired. In order to insure the equal number of positive and negative half cycles, the positive half cycle, applied to the lead 20A through the drive rectifier 17 in the circuit shown in FIGURE 1, is utilized to generate the signal applied to the gate of the slave rectifier 18. Thus, each positive half cycle applied to the motor 11 is immediately followed by a negative half cycle. Obviously, if desired, this polarity could be reversed by appropriate circuit changes.

When the lead 19 is positive with respect to the lead 21, as a result of the application of an A.-C. potential to the line terminals 13, 14, the anode 24 of the drive rectifier 17 is positive with respect to the drive rectifier cathode 25. However, since drive rectifier 17 is a silicon controlled rectifier, the rectifier 17 will not conduct unless an appropriate gate or trigger signal is applied to the drive rectifier gate 26. The drive circuit gate generating transformer 34 has its primary winding 36 connected, in effect, across the A.-C. power source in series with the phasing capacitor 37. Therefore, each positive half cycle of A.-C. power causes a positive pulse to be induced in the drive circuit gate generating transformer secondary winding 35, which pulse is applied across the drive circuit gate potentiometer 28. An appropriate proportion of this pulse, selected to provide the desired positive half cycle voltage-time integral energization, is applied through the potentiometer arm 27 to the drive rectifier gate 26. The drive rectifier 17 is thereby switched to its conducting state, and the positive potential at the drive rectifier anode 24 is applied through the drive rectifier 17 the lead 20A, and the rectifier diode 52 to the lead 20, which is connected to the motor power input terminal 15. Since electrical circuit continuity always exists between the motor power input terminal 16 and the sources of A.-C. power through the lead 21 and line terminal 14, a complete electrical circuit exists for the positive half cycle, and the motor is energized for the duration of this half cycle.

It will be noted that during the positive half cycle the slave transformer primary winding 50 and phasing capacitor 51 are, in effect, connected across the motor power input terminals 15, 16. Therefore, the energization of the motor 11 by the positive half cycle just described as existing in the lead 20 results in a gating pulse being induced in the slave transformer secondary winding 49 and applied to the gate 31 of the slave rectifier 18. The use of the phasing capacitor 51 insures that a positive gate signal is applied to the gate 31 at a time appropriate to cause the slave rectifier 18 to conduct during substantially the entire negative half cycle which is complementary to the preceding half cycle. When the gate signal is so applied, the slave rectifier is switched from its non-conducting or open state to its conducting or closed state, and the motor 11 is energized by a negative half cycle of A.-C. power from the A.-C. power source immediately following the motor energization by a positive half cycle of A.-C. power. A bleeder resistor 53 is provided to insure a sufficient load for proper operation of the silicon controlled rectifiers 17 and 18.

The operation of the circuit, as so far described, consists of the alternate conduction or closing of the drive and slave rectifiers 17, 18, during half cycle periods. The drive and slave rectifiers are rendered non-conductive or opened by the polarity reversal of the potential applied thereto at the end of their respective conduction half cycles. Thus, since the slave rectifier 18 only conducts or closes in response to the conduction or closing of the drive rectifier 17, inhibiting the conduction or closing of the drive rectifier 17 inhibits the application of A.-C. power to the motor 11, since electrical circuit continuity will not exist through the switch 12 during either half cycle if it does not exist during the half cycle when a positive polarity exists at the line terminal 13. The rectifier 52 is preferably included to prevent generated voltage due to motor rotation from triggering the slave rectifier 18. Inhibition of the conduction or closing of the drive rectifier 17 is accomplished by the circuit of FIGURE 1 by selectively applying a low impedance shunt across the drive transformer secondary winding 35, so as to reduce the magnitude of the signal applied to the drive rectifier gate 26 to a value which is insufficient to switch the rectifier 17 to conduction.

In the circuit of FIGURE 1, the low impedance shunt utilized to control the switching of the drive circuit 22 is the reactance winding 39 of the saturable reactor 38. By controlling the degree of saturation of the saturable reactor 38, the shunting impedance of the reactance winding 39 across the drive transformer secondary winding 35 is controlled. Thus, when the conduction of the drive rectifier 17 is to be inhibited, the saturable reactor 38 is saturated, and the reactance winding 39 presents a low impedance shunt, thereby reducing the gating signal which is applied to the drive rectifier gate 26 to a magnitude insufficient to initiate conduction through the drive rectifier 17. The degree of saturation of the saturable reactor 38 is controlled by a D.-C. current flow through the saturable reactor control winding 40 from the charging capacitor 41. The charging capacitor 41 receives a positive charge from each positive half cycle applied to the lead 20A through the drive rectifier 17. The charging circuit time constant is established by the capacitor 41, the current limiting resistor 43, and control potentiometer 44. Electrical circuit continuity for the D.-C. current flow through the saturable reactor control winding 40 is provided by the inductor 46 and fixed resistor 47.

It will be noted that the control potentiometer arm 45 is so connected that its setting or position on the control potentiometer 44 determines the effective resistance of the control potentiometer in the charging circuit, and thus, the time constant of the charging circuit can be varied. When the time constant is large, the positive charge which accumulates on the charging capacitor 41 is small, and the D.-C. current flow through the saturable reactor control winding 40 is insufficient to saturate the saturable reactor 38 to the degree required to inhibit the conduction of the drive rectifier 17. As the time constant of the circuit is decreased by decreasing the effective resistance of the control potentiometer 44, the charge on the charging capacitor 41 increases, and the D.-C. current flow through the staurable reactor control winding 41 becomes sufficient to inhibit the conduction of the drive rectifier 17 until the charge on the charging capacitor 41 decays. By controlling the potential to which the charging capacitor 41 is charged, the duration of the inhibition of the drive rectifier 17 is thus controlled. The setting of the control potentiometer arm 45 then provides a direct control over the inhibition of the drive rectifier 17, and therefore of the slave rectifier 18. The setting of control potentiometer 44 thus controls the duration of the inhibition of the A.-C. switch 12.

Referring now to FIGURE 2, there are shown a series of time-voltage diagrams for the A.-C. potential applied across the motor power input terminals 15, 16 according to the invention for various settings of the control potentiometer 44. In FIGURE 2, voltage, E, is represented as the ordinate value, and varies between plus and minus 1, while time is shown along the abscissa. FIGURE 2(a) illustrates the voltage wave form existing at the line terminals 13, 14 of FIGURE 1, and also illustrates the potential applied across the motor power input terminals 15, 16 when the degree of saturation of the saturable reactor 38 is insufficient to inhibit the conduction of the drive rectifier 17. FIGURE 2(b) illustrates the potential applied across the motor power input terminals 15, 16 when the control potentiometer 44 has an effective resistance selected to provide a charging circuit time constant which will produce a D.-C. current flow through the saturable reactor control winding 40 sufficient to produce a comparatively small amount of saturation of the saturable reactor 38. Inhibition of the application of power to the motor 11 occurs for only one cycle out of a small number of complete cycles. As shown in FIGURE 2(b), the inhibition consists of one cycle in every five. FIGURE 2(c) illustrates the wave form resulting from a further decrease in the control potentiometer 44 effective resistance, such that one cycle in every three is inhibited, thus further reducing the motor speed over that speed provided by the wave form of FIGURE 2(b). FIGURE 2(d) illustrates the inhibition of every other cycle; FIGURE 2(e) represents the inhibition of two of every three cycles; FIGURE 2(f) represents the inhibition of three of every four cycles; and FIGURE 2(g) represents the inhibition of four of every five cycles; in each case the inhibition being accomplished by decreasing the effective resistance of the control potenionmeter 44 so as to decrease the time constant of the charging circuit. It will be recognized by those skilled in the art that the wave forms shown in FIGURE 2 correspond to the application to the motor 11 through the rectifiers 17, 18 of a sinusoidal voltage-time integral energization, and that other voltage-time integral configurations can be obtained by adjustment of the potentiometer arms 27, 32, so as to effectively further reduce the energization power applied to and therefore the speed of the motor 11 for a given cyclical inhibition. It will be clear from FIGURE 2 that the invention, in its method aspects, relates to the inhibition of the application to the motor of a selected number of one half cycles of line power, so as to reduce the effective frequency applied to the motor, and thereby reduce the motor speed in relation to the change in the effective frequency applied, for a selected voltage-time integral configuration, providing, in effect, a continuously variable speed control from zero to rated motor speed.

It will be understood from the foregoing description that the circuit of FIGURE 1 illustrates the invention in conjunction with a single phase power source. As will be apparent to those skilled in the art, in view of the preceding description of the operation of the circuit, the invention is equally applicable to polyphase induction and synchronous motors, and it is to be understood that the use of a single phase embodiment is for explanatory rather than limiting purposes. Typical values for circuit components when utilized with a fractional horsepower motor are as follows:

17, 18, Type T140A2, 3 ampere, 200 peak inverse volt silicon controlled rectifier
28, 33, 200 ohm, 2 watt potentiometer
44, 5000 ohm, 4 watt potentiometer
47, 5000 ohm, 10 watt resistor
43, 47 ohm, ½ watt resistor
37, 51, 0.1 microfarad, 400 volt capacitor
41, 10 microfarad, 200 volt capacitor
34, 48, 115:6, 10 watt transformer
38, 250:50, 6 volt saturable reactor
46, 1 henry, 70 ohm inductor
42, 750 milliampere, 400 peak inverse volt diode
52, 3 ampere, 200 peak inverse voltage rectifier
53, 100 ohm, 25 watt resistor Thus, it will be seen that the present invention provides a new system for speed control of induction and synchronous motors, which accomplishes the same results as do conventional systems, and which requires, in its apparatus aspects, considerably less equipment than conventional systems, as is shown in FIGURE 1. In the apparatus of the invention, two silicon controlled rectifiers are connected back-to-back to form an A.-C. switch. This switch is connected between the power source and the motor terminals so as to switch the full motor current from the A.-C. line source. A control circuit is provided to trigger the silicon controlled rectifiers at appropriate times. By adjustment of the control circuit it is possible to vary the wave shape of the voltage applied to the motor by eliminating the application of one or more cycles of the A.-C. line power. A few of the wave shapes which are possible are illustrated in FIGURE 2. When the full sinusoidal wave form is applied to the motor, the motor will run at its normal or full speed. As the control circuit is adjusted to leave out cycles periodically, the frequency of energization applied to the motor is effectively reduced. The motor speed is therefore reduced. Intermediate speeds can be obtained by changing from one wave shape to another, and by changing the number of cycles applied through the A.-C. switch per unit of time, so that, in effect, a continuous range of motor speed is obtained. Either single phase or polyphase motors can be controlled in this manner. Because of the switching action performed by the silicon controlled rectifiers, speed control according to the invention in its apparatus aspect is accomplished without a large power loss in the control system.

An important feature of any control system for induction motors is the elimination or reduction to a minimum value of any direct current component in the power supply. Such a direct current component will provide a dynamic braking action, and thus tend to slow down the motor. A direct current component of this type will occur if the number of positive half cycles and negative half cycles are not equal. Also, if the voltage time integrals of the positive half cycles are not equal to the voltage time integrals of the negative half cycles, a direct current component will result and therefore interfere with proper motor operation. In the circuit of FIGURE 1, the phasing capacitors 37 and 51 by phasing the triggering of the switches, insure that the voltage time integrals will be equal, so as to eliminate this possible source of a D.-C. component. In addition, the reduction in effective frequency of the A.-C. line power applied to the motor is accomplished, in the preferred embodiment, without changing the one-half cycle voltage time integral, and saturation of the magnetic circuits is therefore avoided. The control system of the present invention accomplishes this objective in the preferred embodiment of the apparatus by providing an equal number of half cycles of positive and negative pulses to energize the motor for any speed setting.

It will be understood by those familiar with the art that other controlling elements can be substituted for potentiometer 44 without modifying the spirit of this invention. Thus an electron tube or transistor can be used to establish the speed or torque of a motor. Signals controlling the electron tube or transistor can be derived from other sources or can be a measure of motor speed and thus form a feed back control system.

In addition, the saturating winding 40 of the saturable reactor 38 can be controlled by other means such as current from flip-flop or Schmitt trigger circuit so as to produce a definite effective frequency for synchronizing or similar applications.

It will also be understood that conventional networks may be incorporated in the motor circuit so as to compensate for the motor power factor.

Motors of larger size can be controlled by multi-stage circuits in which a circuit similar to that shown in FIGURE 1 is used to drive a set of larger silicon controlled rectifiers. Reduced voltage operation may be combined with control of the effective frequency by retarding the firing angle of the silicon controlled rectifiers by means of conventional circuits.

Furthermore, it is to be understood that the circuit of FIGURE 1 is shown with rectifier connections such as to utilize the positive portion of the potential to actuate the switch. Obviously, by reversing the connections of the rectifiers, the negative portion of the applied potential can be utilized to actuate the switch. Therefore, where the terms anode and cathode are utilized in the specification and claims, it is to be understood that such terms are utilized to describe the circuit elements relative to each other, and the present invention may equally well be practiced in a circuit utilizing such reversal of connection. The specification and claims are therefore to be so interpreted:

The invention claimed is:

1. In a device for controlling the speed of motors of the induction and synchronous types, the combination of:
    a source of an A.-C. potential;
    a pair of input terminals to which said A.-C. potential is applied;
    a first silicon controlled rectifier having an anode, a cathode, and a gate electrode;
    a second silicon controlled rectifier having an anode, a cathode, and a gate electrode;
    means connecting the first silicon controlled rectifier anode and the second silicon controlled rectifier cathode to one of the A.-C. input terminals;
    means connecting the first silicon controlled rectifier cathode and the second silicon controlled rectifier anode to the motor;
    a first transformer having a primary winding and a secondary winding;
    means connecting the first transformer primary winding across the source of A.-C. potential;
    a first potentiometer having an output terminal;
    means connecting the potentiometer in parallel with the first transformer secondary winding;
    means connecting the first potentiometer output terminal to the first silicon controlled rectifier gate electrode;
    a second transformer having a primary winding and a secondary winding;
    means connecting the second transformer primary winding across the motor between the A.-C. potential source and the first silicon controlled rectifier cathode;
    a second potentiometer having an output arm;
    means connecting the second potentiometer across the second transformer secondary winding and to the second silicon controlled rectifier cathode;
    means connecting the second potentiometer output arm to the second silicon controlled rectifier gate electrode;
    a saturable reactor having a reactance winding and a control winding;
    means connecting the saturable reactor reactance winding across the first transformer secondary winding; and
    means for periodically passing a control current through the saturable reactor control winding to cyclically saturate for a selected variable period said saturable reactor.

2. The combination of claim 1 and in which the means for periodically passing a control current includes a selectively variable time constant charging circuit connected across the motor between the A.-C. potential source and the first silicon controlled rectifier cathode.

3. The combination of claim 2, and in which the selectively variable time constant charging circuit comprises a charging circuit rectifier having an anode and a cathode, means connecting the charging circuit rectifier anode to the first silicon controlled rectifier cathode, a first series circuit including a potentiometer and a charging capacitor, a second series circuit including the saturable reactor control winding and a resistor, and means connecting the first and second series circuits in parallel to each other and in series with the charging circuit rectifier cathode across the motor.

4. In a device for the control of the speed of electric motors of the induction and synchronous types, the combination of:
    a source of A.-C. potential;
    normally open A.-C. switch means connected between the source of A.-C. potential and the motor and including first and second switch elements connected in back-to-back relationship, each of said switch elements having a gate electrode;
    a source of gating pulses normally operable when applied to the first switch element gate electrode to close the first switch element;
    means for coupling said gating pulses to said first switch element gate electrode;
    a saturable reactor having a reactance winding and a control winding;
    means connecting the reactance winding with the gate pulse coupling means so that the degree of saturable reactor saturation controls the application of the gate pulses to the first switch element gate electrode by said coupling means; and
    means connected to the saturable reactor control winding for controlling the saturation of the saturable reactor.

5. In a device for the control of the speed of electric motors of the induction and synchronous types, the combination of:

a source of A.-C. potential;

normally open A.-C. switch means connected between the source of A.-C. potential and the motor;

means for cyclically closing the A.-C. switch means to apply the A.-C. potential to the motor;

means for selecting the period of closure of the A.-C. switch means and for maintaining switch closure for an integral number of half cycles of the A.-C. potential including (a) a first switch element operable to apply a half cycle of a selected polarity of the A.-C. potential to the motor;

(b) a second switch element operable to apply a succeeding half cycle, of opposite polarity, of A.-C. potential to the motor in response to the application thereto of said half cycle of selected polarity;

wherein said first and second switch elements are silicon controlled rectifiers, each having an anode, a cathode, and a gate electrode, and the A.-C. switch means includes means connecting said rectifiers between the A.-C. potential source and the motor in a back-to-back relationship; and (c) said means for selecting the period of closure of the A.-C. switch means including (i) a source of gating pulses normally operable to close the first switch element when applied to the first switch element gate electrode; (ii) means for coupling gating pulses to the gate electrode of the first switch element; (iii) a saturable reactor having a reactance winding and a control winding; (iv) means connecting the reactance winding in shunt with the coupling means so that, when the saturable reactor is saturated, the gating pulses coupled by the coupling means to the first switch element gate electrode are now operable to close the first switch element; and (v) means connected to the saturable reactor control winding for controlling the saturation of the saturable reactor.

6. The combination of claim 5, and in which the means for controlling the saturation of the saturable reactor includes a charging circuit connected to the saturable reactor control winding, means for applying half cycle pulses of a given polarity from the A.-C. potential source to the charging circuit when the A.-C. switch is closed, and means for selectively varying the time constant of the charging circuit.

References Cited by the Examiner

UNITED STATES PATENTS

| 3,192,466 | 6/1965 | Sylvan et al. | 323—24 X |
| 3,204,113 | 8/1965 | Snygg | 307—88 |
| 3,209,228 | 9/1965 | Gawron | 318—241 X |
| 3,244,962 | 4/1966 | Genuit | 323—24 X |

ORIS L. RADER, *Primary Examiner.*

B. DOBECK, *Assistant Examiner.*